(12) United States Patent
Guo

(10) Patent No.: US 11,881,182 B1
(45) Date of Patent: Jan. 23, 2024

(54) LIGHT-EMITTING DEVICE DRIVER CHIP, BACKLIGHT MODULE, AND DISPLAY PANEL

(71) Applicant: TCL China Star Optoelectronics Technology Co., Ltd., Guangdong (CN)

(72) Inventor: Xiaoying Guo, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/897,291

(22) Filed: Aug. 29, 2022

(30) Foreign Application Priority Data

Jul. 4, 2022 (CN) .......................... 202210785911.4

(51) Int. Cl.
G09G 3/34 (2006.01)

(52) U.S. Cl.
CPC ...................... *G09G 3/3406* (2013.01); *G09G 2300/0828* (2013.01); *G09G 2320/0626* (2013.01); *G09G 2330/028* (2013.01)

(58) Field of Classification Search
CPC ......... G09G 3/3406; G09G 2300/0828; G09G 2320/0626; G09G 2330/028
See application file for complete search history.

(56) References Cited

U.S. PATENT DOCUMENTS

| | | | | |
|---|---|---|---|---|
| 9,740,046 B2* | 8/2017 | Wyatt | ................ | G02F 1/133603 |
| 10,203,553 B2* | 2/2019 | Yang | ................ | G02F 1/133621 |
| 10,204,567 B2* | 2/2019 | Yang | ................ | G09G 3/3426 |
| 10,262,599 B2* | 4/2019 | Lang | ................ | G09G 3/3426 |
| 10,504,453 B1* | 12/2019 | Jung | ................ | G09G 3/3648 |
| 10,964,275 B2* | 3/2021 | Petrovich | .......... | G02F 1/133603 |
| 11,727,865 B1* | 8/2023 | Yang | ........................ | G09G 3/32 345/204 |
| 2005/0151717 A1* | 7/2005 | Seo | ........................ | H05B 45/18 345/102 |
| 2005/0168413 A1* | 8/2005 | Suzuki | ................. | G09G 3/2944 345/60 |
| 2005/0212824 A1* | 9/2005 | Marcinkiewicz | .... | G09G 3/3406 345/690 |
| 2008/0203929 A1* | 8/2008 | Park | ....................... | H05B 45/22 315/158 |
| 2008/0297497 A1* | 12/2008 | Lu | ........................ | G09G 3/3648 345/208 |
| 2009/0303264 A1* | 12/2009 | Toshima | ............... | G09G 3/3648 345/690 |

(Continued)

*Primary Examiner* — Benyam Ketema

(57) ABSTRACT

Aa light-emitting device driver chip, a backlight module, and a display panel are provided. The light-emitting device driver chip includes at least two current control circuits and a parallel control circuit. Each of the at least two current control circuits includes a current control module. A control output node of the current control module is electrically connected to a corresponding one of the output ports. The parallel control circuit is electrically connected between the at least two current control circuits and is configured to control, according to a parallel control signal received from a first input port, the current control modules of the at least two current control circuits to be electrically connected to enable the current control modules of the at least two current control circuits to output the same current to corresponding ones of the output ports through the control output nodes.

14 Claims, 8 Drawing Sheets

(56) References Cited

U.S. PATENT DOCUMENTS

| | | | |
|---|---|---|---|
| 2010/0045642 A1* | 2/2010 | Satoh | H01L 23/552 345/98 |
| 2010/0066752 A1* | 3/2010 | Watanuki | G09G 3/3426 345/589 |
| 2010/0195024 A1* | 8/2010 | Yoo | G09G 3/3406 315/297 |
| 2010/0289735 A1* | 11/2010 | Hosogi | H05B 45/46 362/97.1 |
| 2010/0295839 A1* | 11/2010 | Nagaya | H04N 5/63 345/212 |
| 2011/0227503 A1* | 9/2011 | Yuan | G09G 3/3406 315/294 |
| 2013/0021386 A1* | 1/2013 | Min | G09G 3/3413 345/102 |
| 2013/0050167 A1* | 2/2013 | Yamanaka | G09G 5/003 345/204 |
| 2013/0057166 A1* | 3/2013 | Gao | H05B 45/46 315/192 |
| 2014/0313183 A1* | 10/2014 | Harada | G09G 3/3611 345/212 |
| 2015/0010248 A1* | 1/2015 | Chuang | G06T 5/007 382/274 |
| 2015/0268778 A1* | 9/2015 | Okamura | G06F 3/0446 345/173 |
| 2015/0348487 A1* | 12/2015 | Zheng | G09G 3/3611 345/99 |
| 2016/0119995 A1* | 4/2016 | Han | H03K 5/1532 315/193 |
| 2017/0039939 A1* | 2/2017 | Chaji | G09G 3/3225 |
| 2017/0245339 A1* | 8/2017 | Modepalli | H05B 45/375 |
| 2018/0277036 A1* | 9/2018 | Maeda | G09G 3/32 |
| 2018/0293955 A1* | 10/2018 | Liu | H03K 19/0175 |
| 2019/0340972 A1* | 11/2019 | Hao | G09G 3/2088 |
| 2020/0005710 A1* | 1/2020 | Miyata | G09G 3/3233 |

* cited by examiner

LIGHT-EMITTING DEVICE DRIVER CHIP, BACKLIGHT MODULE, AND DISPLAY PANEL

RELATED APPLICATIONS

This application claims the benefit of priority of Chinese Patent Application No. 202210785911.4 filed on Jul. 4, 2022, the contents of which are incorporated by reference as if fully set forth herein in their entirety.

TECHNICAL FIELD

The present disclosure relates to the display technology field, and more particularly to a light-emitting device driver chip, a backlight module, and a display panel.

BACKGROUND ART

After a light-emitting device driver chip is manufactured, a current value outputted by a chip output terminal has an upper limit (e.g., a maximum output current is 20 mA). A light-emitting brightness generated by a light-emitting device corresponding to the maximum output current is a first highest brightness which the driver chip can enable the light-emitting device to generate. When the light-emitting brightness of the light-emitting device is to be greater than the light-emitting brightness corresponding to the maximum output current, it is necessary to replace the light-emitting device driver chip with a the light-emitting device driver chip with a larger output current parameter. Accordingly, an applicable range of the existing light-emitting device driver chips is narrow.

SUMMARY OF DISCLOSURE

Embodiments of the present disclosure provide a light-emitting device driver chip, a backlight module, and a display panel capable of increasing a current range of the light-emitting device driver chip to broaden an applicable of the light-emitting device driver chip.

An embodiment of the present disclosure provides a light-emitting device driver chip. The light-emitting device driver chip has a plurality of output ports. The light-emitting device driver chip includes at least two current control circuits and a parallel control circuit.

Each of the at least two current control circuits includes a current control module. A control output node of the current control module is electrically connected to a corresponding one of the output ports. The parallel control circuit is electrically connected between the at least two current control circuits and is configured to control, according to a parallel control signal received from a first input port, the current control modules of the at least two current control circuits to be electrically connected to enable the current control modules of the at least two current control circuits to output the same current to corresponding ones of the output ports through the control output nodes.

Optionally, in some embodiments of the present disclosure, the current control module includes a voltage generating unit and a current generating unit. A voltage output node of the voltage generating unit is electrically connected to a voltage input node of the current generating unit. The current generating unit is configured to receive a voltage signal generated by the voltage generating unit to generate a current output to the control output node.

The parallel control circuit includes a first parallel control module. The first parallel control module is electrically connected between the current control modules of the at least two current control circuits and is configured to enable, according to the parallel control signal, the voltage output nodes of the voltage generating units of the current control modules to be electrically connected. One of the voltage generating units of the current control modules is configured to provide the voltage signal for the current generating units of the current control modules.

Optionally, in some embodiments of the present disclosure, the current generating unit includes an operational amplifier, a first transistor, and a first resistor. The first resistor is connected in series between one of a source electrode and a drain electrode of the first transistor and a first voltage terminal, and the first resistor is connected in series between an inverting input terminal of the operational amplifier and the first voltage terminal. The voltage output node of the voltage generating unit is electrically connected to a non-inverting input terminal of the operational amplifier through the voltage input node of the current generating unit. A gate electrode of the first transistor is connected to an output terminal of the operational amplifier. The other of the source electrode and the drain electrode of the first transistor is electrically connected to the control output node. The first parallel control module is electrically connected to the non-inverting input terminals of the operational amplifiers of the current control modules.

Optionally, in some embodiments of the present disclosure, the voltage generating unit includes a voltage information register and a digital-to-analog converter. One terminal of the digital-to-analog converter is electrically connected to the voltage information register, and the other terminal of the digital-to-analog converter is electrically connected to the non-inverting input terminal of the operational amplifier through the voltage output node of the voltage generating unit.

Optionally, in some embodiments of the present disclosure, each of the at least two current control circuits further includes a dimming module. A dimming input node of the dimming module is electrically connected to the control output node of the current control module, and a dimming output node of the dimming module is electrically connected to a corresponding one of the output ports. The parallel control circuit is further configured to electrically connect the dimming modules of the at least two current control circuits according to the parallel control signal to enable the at least two current control circuits to output the same current to the corresponding ones of the output ports.

Optionally, in some embodiments of the present disclosure, the dimming module includes a dimming control unit and a dimming switch unit. A control output terminal of the dimming control unit is electrically connected to a dimming control terminal of the dimming switch unit. A dimming input terminal of the dimming switch unit is electrically connected to the dimming input node of the dimming module, and a dimming output terminal of the dimming switch unit is electrically connected to the dimming output node of the dimming module.

The parallel control circuit further includes a second parallel control module. The second parallel control module is electrically connected between the dimming modules of the at least two current control circuits and is configured to enable, according to the parallel control signal, the control output terminals of the dimming control units of the at least two current control circuits to be electrically connected. One of the dimming control units of the at least two current control circuits is configured to provide a dimming control signal for the dimming switch units of the at least two current control circuits.

Optionally, in some embodiments of the present disclosure, the dimming control unit includes a dimming register. An output terminal of the dimming register serves as the control output terminal of the dimming control unit. The dimming switch unit includes a second transistor. A gate electrode of the second transistor serves as the dimming control terminal of the dimming switch unit, and a source electrode and a drain electrode of the second transistor serve as the dimming input terminal and the dimming output terminal of the dimming switch unit, respectively.

Optionally, in some embodiments of the present disclosure, the first parallel control module includes a first parallel transistor. A source electrode and a drain electrode of the first parallel transistor are electrically connected between the non-inverting input terminals of the operational amplifiers of the current control modules.

The second parallel control module includes a second parallel transistor. A gate electrode of the first parallel transistor and a gate electrode of the second parallel transistor are electrically connected to the first input port. A source electrode and a drain electrode of the second parallel transistor are electrically connected between the gate electrodes of the second transistors of the dimming modules of the at least two current control circuits.

Optionally, in some embodiments of the present disclosure, the light-emitting device driver chip further includes at least one second input port. The at least two current control circuits include a first current control circuit and a second current control circuit. The second current control circuit includes a parallel selecting module; and The parallel selecting module is configured, according to a parallel selecting signal received by a corresponding one of the at least one second input port, to control the dimming module of the second current control circuit and the dimming module of the first current control circuit to be electrically connected, and to control the current control module of the second current control circuit and the current control module of first current control circuit to be electrically connected.

Optionally, in some embodiments of the present disclosure, the parallel selecting module includes a first selecting transistor and a second selecting transistor. A source electrode and a drain electrode of the first selecting transistor are electrically connected between the non-inverting input terminal of the operational amplifier of the second current control circuit and one of the source electrode and the drain electrode of the first parallel transistor. A source electrode and a drain electrode of the second selection transistor are electrically connected between the gate electrode of the second transistor of the second current control circuit and one of the source electrode and the drain electrode of the second parallel transistor. The gate electrode of the first selecting transistor and the gate electrode of the second selecting transistor in the second current control circuit are electrically connected to the second input port.

An embodiment of the present disclosure further provides a backlight module including any one of the above-mentioned light-emitting device driver chips and a light-emitting unit connected to any one of the above-mentioned light-emitting device driver chips. The light-emitting unit includes at least one light-emitting device. When the backlight module works in a first mode, the current control modules of the at least two current control circuits output the same current to the corresponding ones of the output ports through the control output nodes, and the output ports of the light-emitting device driver chip corresponding to the at least two current control circuits are electrically connected to each other.

Optionally, in some embodiments of the present disclosure, the backlight module further includes a control module. The control module is electrically connected to the first input port and is configured to output the parallel control signal.

Optionally, in some embodiments of the present disclosure, the control module includes a second resistor and a third resistor. The second resistor connected in series between a second voltage terminal and the first input port. The third resistor connected in series between a first voltage terminal and the first input port. When the parallel control circuit electrically connects the current control modules of the at least two current control circuits, a voltage signal supplied by the first voltage terminal and a voltage signal supplied by the second voltage terminal are not equal.

An embodiment of the present disclosure further provides a display panel including any one of the above-mentioned light-emitting device driver chips and any one of the above-mentioned backlight modules.

In the light-emitting device driver chip, the backlight module, and the display panel, the light-emitting device driver chip includes at least two current control circuits and a parallel control circuit. Each of the at least two current control circuits includes a current control module. A control output node of the current control module is electrically connected to a corresponding one of the output ports. The parallel control circuit is electrically connected between the at least two current control circuits and is configured to control, according to a parallel control signal received from a first input port, the current control modules of the at least two current control circuits to be electrically connected to enable the current control modules of the at least two current control circuits to output the same current to corresponding ones of the output ports through the control output nodes. The backlight module and the display panel include the light-emitting device driver chip. When a current outputted from each of the at least two current control circuits to a corresponding one of the output ports cannot meet usage requirements, the current control modules of the at least two current control circuits are electrically connected by the parallel control circuit and the parallel control signal received by the first input port. As such, the currents outputted by the current control modules of the at least two current control circuits to the corresponding ones of the output ports are the same. By electrically connecting the corresponding ones of the output orts of the light-emitting device driver chip corresponding to the at least two current control circuits, the currents are superimposed to provide a greater current for light-emitting devices. Accordingly, the light-emitting device driver chip, the backlight module, and the display panel provided by the embodiments of the present disclosure can increase a current range of the light-emitting device driver chip to broaden an applicable of the light-emitting device driver chip.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

DETAILED DESCRIPTION OF EMBODIMENTS

Figure 1:
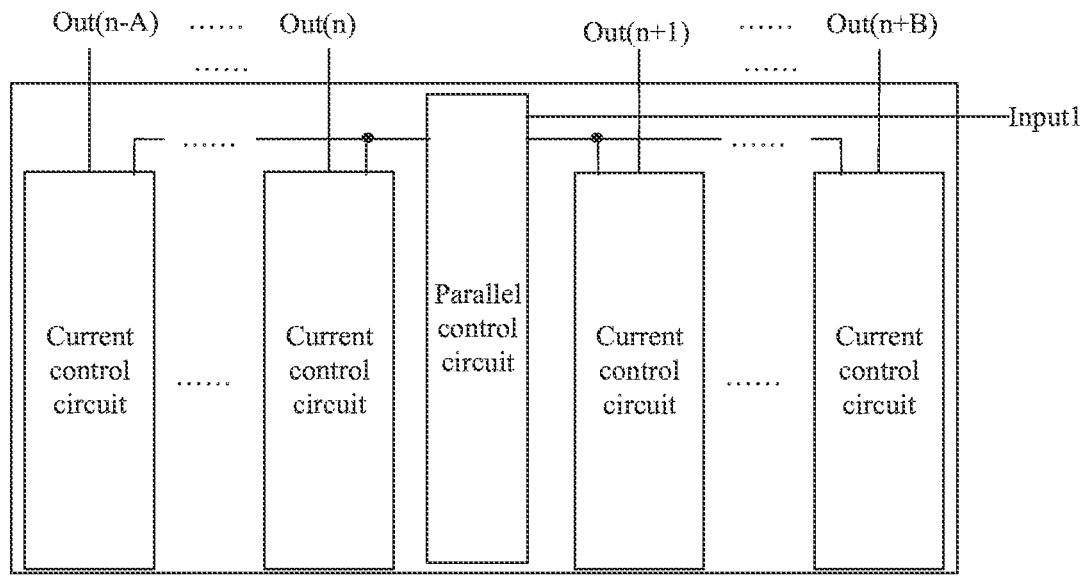
FIG. 1 illustrates a schematic structural diagram of a light-emitting device driver chip provided by an embodiment of the present disclosure.

The following clearly describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure. Furthermore, it should be understood that specific implementations described herein are only used to illustrate and explain the present disclosure, and are not used to limit the present disclosure. In the present disclosure, if no explanation is made to the contrary, used orientation words, such as "upper" and "lower", generally refer to upper and lower directions of a device in an actual use or a working state, and specifically refer to drawing directions in the drawings. Words "inner" and "outer" refer to an outline of a device.

Specifically, FIG. 1 illustrates a schematic structural diagram of a light-emitting device driver chip provided by an embodiment of the present disclosure. The embodiment of the present disclosure provides the light-emitting device driver chip. The light-emitting device driver chip has a plurality of output ports Out. FIG. 1 only illustrates an Out(n−A) port to an Out(n+B) port in the output ports Out corresponding to a current control circuit group.

The light-emitting device driver chip includes at least one current control circuit group and a parallel control circuit.

Optionally, the current control circuit group includes at least two current control circuits. Optionally, each of the at least two current control circuits includes a current control module. The current control module is configured to generate a current to output the current through a corresponding one of the output ports Out.

Specifically, the current control circuit group includes a plurality of current control circuits. A control output node of a current control module in a (n−A)th current control circuit can be electrically connected to an (n−A)th output port Out (n−A) in the output ports Out. A control output node of a current control module in an nth current control circuit can be electrically connected to an nth output port Out (n) in the output ports Out. A control output node of a current control module in a (n+1)th current control circuit can be electrically connected to an (n+1)th output port Out (n+1) in the output ports Out. A control output node of a current control module in a (n+B)th current control circuit can be electrically connected to an (n+B)th output port Out (n+B) in the output ports Out. Among them, n is greater than or equal to 1, A is greater than or equal to 1, and B is greater than or equal to 1.

The parallel control circuit is electrically connected between the at least two current control circuits and is configured to control, according to a parallel control signal received from a first input port Input1, the current control modules of the at least two current control circuits to be electrically connected to enable the current control modules of the at least two current control circuits to output the same current to the corresponding output ports Out through the control output nodes.

Specifically, the parallel control circuit can control, according to the parallel control signal, the at least two current control circuits in the (n−A)th current control circuit, . . . , the nth current control circuit, the (n+1)th current control circuit, and the (n+B)th current control circuit included in the current control circuit group to be electrically connected to enable the at least two current control circuits which are electrically connected through the current control modules to output the same current to the corresponding output ports Out.

Optionally, the current control circuits can have different implementation forms. Specifically, FIG. 2A to FIG. 2F illustrate schematic diagrams of connection structures of the current control circuits and the parallel control circuit provided by embodiments of the present disclosure. Each of the current control modules includes a voltage generating unit and a current generating unit. A voltage output node of the voltage generating unit is electrically connected to a voltage input node of the current generating unit. The current generating unit is configured to receive a voltage signal generated by the voltage generating unit to generate a current output to the control output node.

Figure 2A:
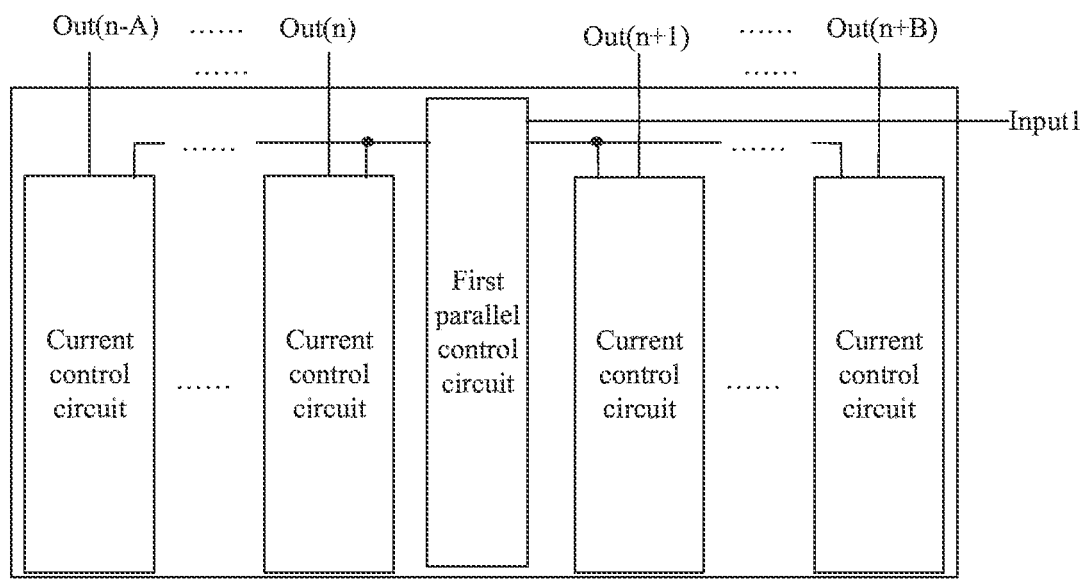
FIG. 2A to FIG. 2F illustrate schematic diagrams of connection structures of current control circuits and a parallel control circuit provided by embodiments of the present disclosure.
Figure 2B:
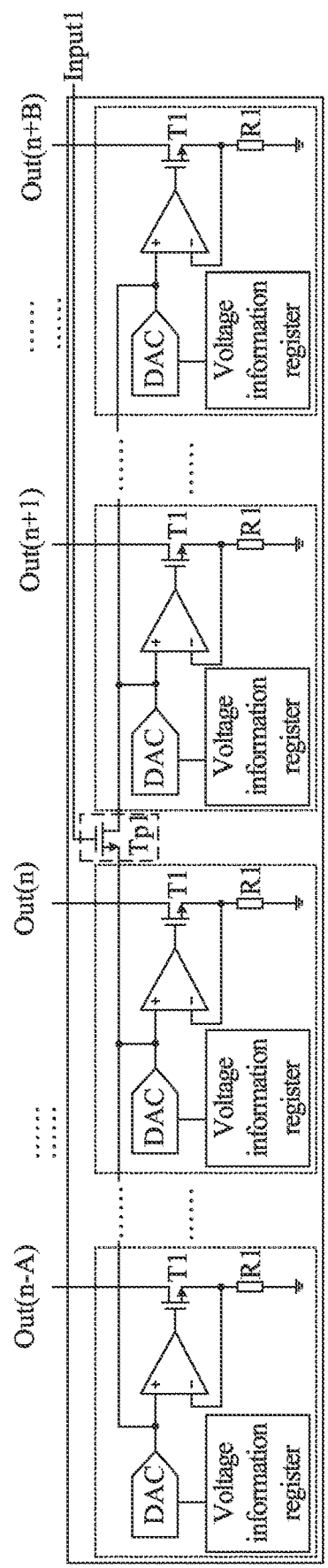
Figure 2C:
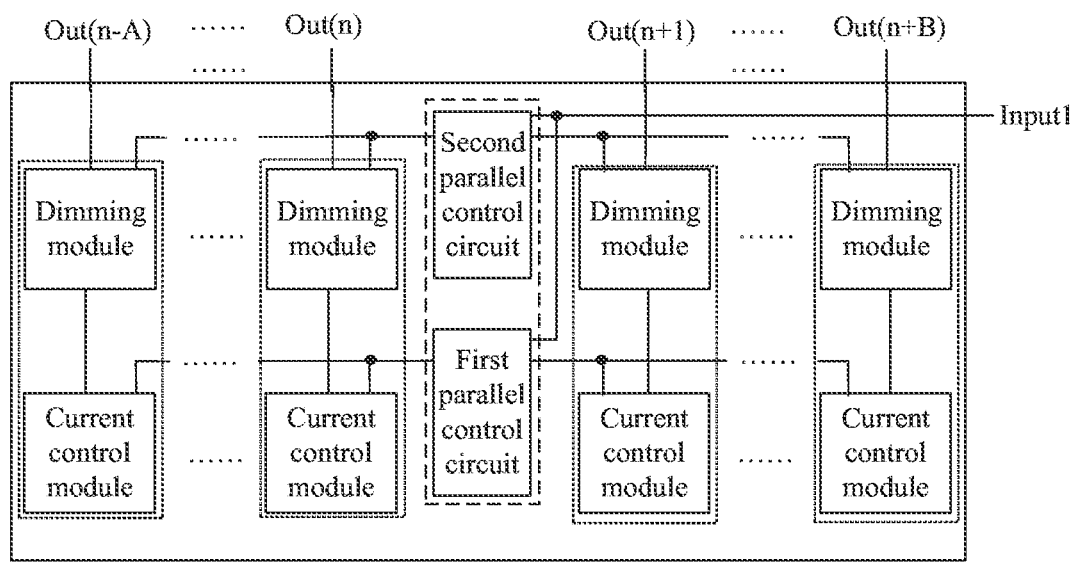
Figure 2D:
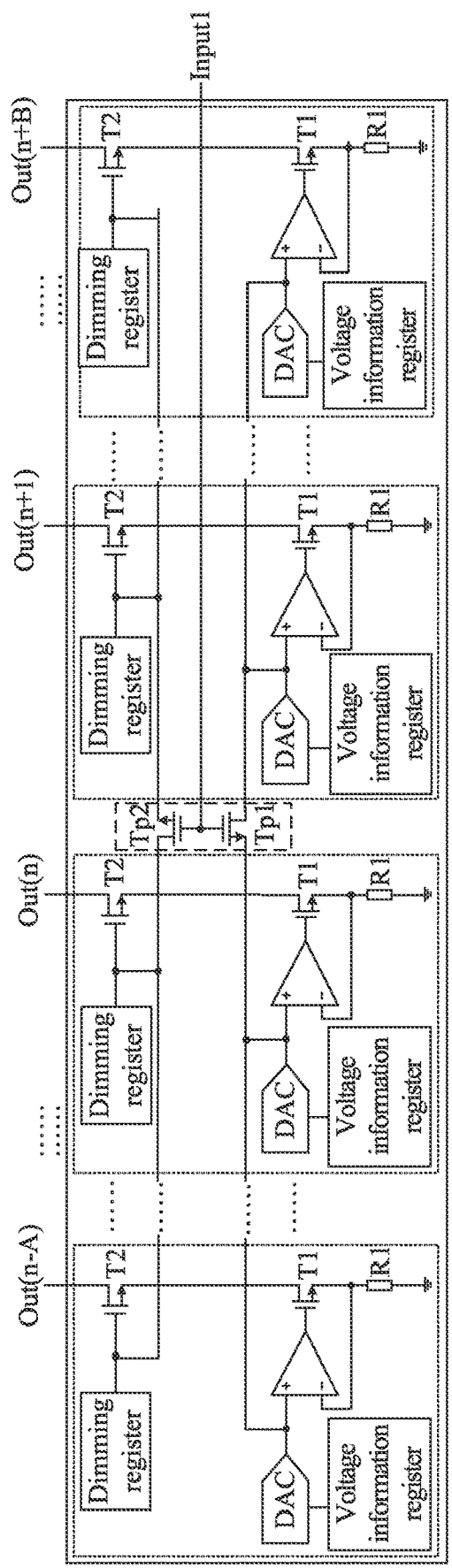
Figure 2E:
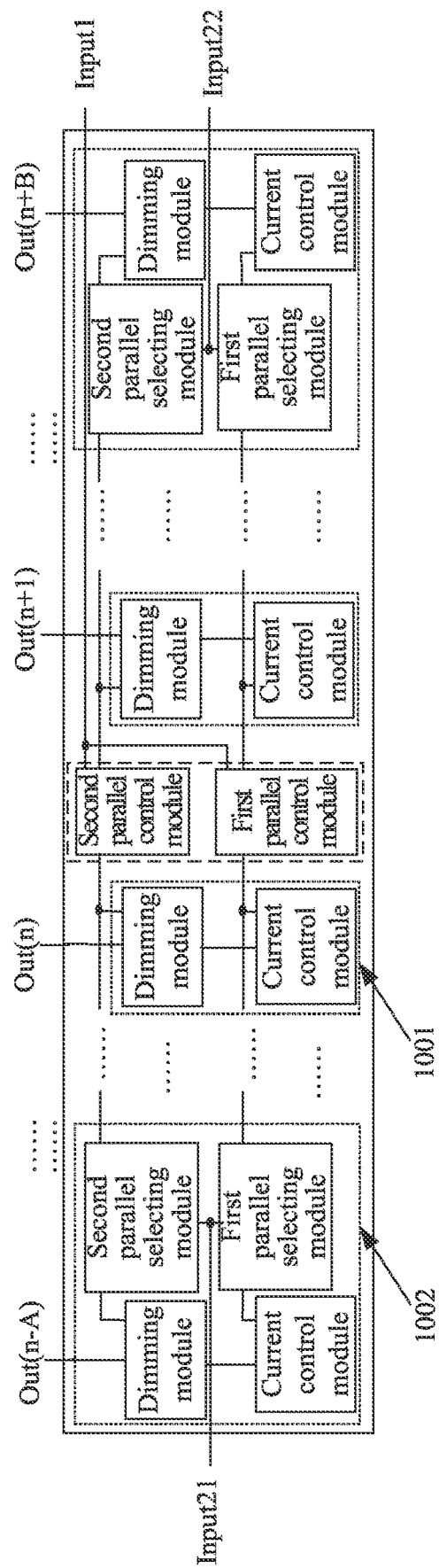
Figure 2F:
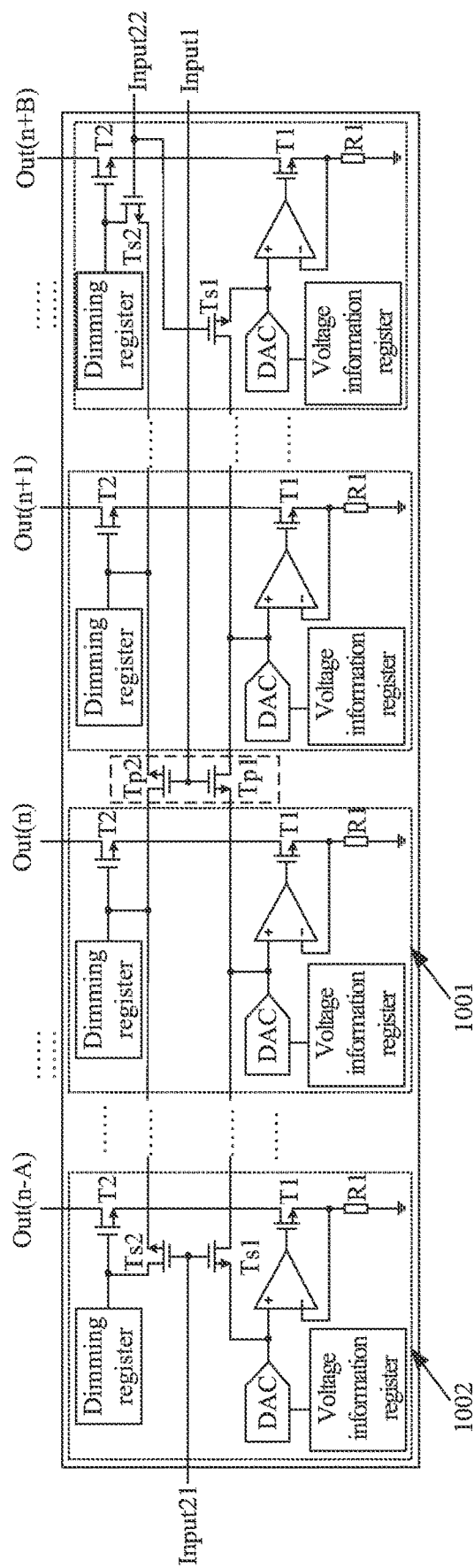

Optionally, as shown in FIG. 2B, FIG. 2D, and FIG. 2F, the current generating unit includes an operational amplifier, a first transistor T1, and a first resistor R1. The first resistor R1 is connected in series between one of a source electrode and a drain electrode of the first transistor T1 and a first voltage terminal, and the first resistor R1 is connected in series between an inverting input terminal of the operational amplifier and the first voltage terminal. The voltage output node of the voltage generating unit is electrically connected to a non-inverting input terminal of the operational amplifier through the voltage input node of the current generating unit. A gate electrode of the first transistor T1 is connected to an output terminal of the operational amplifier. The other of the source electrode and the drain electrode of the first transistor T1 is electrically connected to the control output node. Optionally, the first voltage terminal is a ground terminal.

Optionally, as shown in FIG. 2B, FIG. 2D, and FIG. 2F, the voltage generating unit includes a voltage information register and a digital-to-analog converter DAC. One terminal of the digital-to-analog converter DAC is electrically connected to the voltage information register, and the other terminal of the digital-to-analog converter DAC is electrically connected to the non-inverting input terminal of the operational amplifier through the voltage output node of the voltage generating unit.

Optionally, in some embodiments, as shown in FIG. 2C to FIG. 2F, in order to enable the light-emitting device driver chip to meet usage requirements of a regional dimming control method, each of the at least two current control circuits further includes a dimming module. Each of the current control circuits further includes the dimming module. A dimming input node of the dimming module is electrically connected to the control output node of the current control module. A dimming output node of the dimming module is electrically connected to a corresponding one of the output ports Out. Correspondingly, the parallel control circuit is further configured to electrically connect the dimming modules of the at least two current control circuits according to the parallel control signal to enable the at least two current control circuits to output the same current to the corresponding output ports.

Optionally, the dimming module includes a dimming control unit and a dimming switch unit. A control output terminal of the dimming control unit is electrically connected to a dimming control terminal of the dimming switch unit. A dimming input terminal of the dimming switch unit is electrically connected to the dimming input node of the dimming module. A dimming output terminal of the dimming switch unit is electrically connected to the dimming output node of the dimming module.

Optionally, the dimming control unit includes a dimming register. An output terminal of the dimming register serves as the control output terminal of the dimming control unit. The dimming switch unit includes a second transistor T2. As shown in FIG. 2D and FIG. 2F, a gate electrode of the second transistor T2 serves as the dimming control terminal of the dimming switch unit, and a source electrode and a drain electrode of the second transistor T2 serve as the dimming input terminal and the dimming output terminal of the dimming switch unit, respectively.

It can be understood that according to different types of the current control circuits, the parallel control circuit should have different forms. Specifically, when each of the current control circuits includes only a current control module, the parallel control circuit includes only a first parallel control module. When each of the current control circuits includes a current control module and a dimming module, the parallel control circuit includes a first parallel control module and a second parallel control module.

Specifically, please continue to refer to FIG. 2A to FIG. 2F. The first parallel control module is electrically connected between the current control modules of the at least two current control circuits and is configured to enable, according to the parallel control signal, the voltage output nodes of the voltage generating units of the at least two current control modules to be electrically connected. One of the voltage generating units of the at least two current control modules is configured to provide the voltage signal for the current generating units of the at least two current control modules. For example, according to the parallel control signal, the first parallel control module enables the voltage output node of the voltage generating unit of the current control module in the nth current control circuit to be electrically connected to the voltage output node of the current control module in the (n+1)th current control circuit. As such, since the voltage output node of the voltage generating unit in each of the current control circuits is electrically connected to the voltage input node of the current generating unit, the voltage input node of the current generating unit of the current control module in the nth current control circuit is electrically connected to the voltage input node of the current generating unit of the current control module in the n+1 th current control circuit. Both of the voltage generating unit of the current control module in the nth current control circuit and the voltage generating unit of the current control module in the (n+1)th current control circuit can provide the voltage signal for the current generating unit of the current control module in the nth current control circuit and the current generating unit of the current control module in the (n+1)th current control circuit. In order to better realize a parallel connection of the nth current control circuit and the (n+1)th current control circuit to avoid a situation that parallel voltages are inconsistent, the voltage signal is provided for the current generating unit of the current control module in the nth current control circuit and the current generating unit of the current control module in the (n+1)th current control circuit by the voltage generating unit of the current control module in the nth current control circuit or the voltage generating unit of the current control module in the (n+1)th current control circuit.

Optionally, the first parallel control module includes a first parallel transistor Tp1. A source electrode and a drain electrode of the first parallel transistor Tp1 are electrically connected between the non-inverting input terminals of the operational amplifiers of the current control modules of the at least two current control circuits. A gate electrode of the first parallel transistor Tp1 is electrically connected to the first input port Input 1.

Optionally, the first parallel control module can include a plurality of first parallel transistors Tp1. A source electrode and a drain electrode of each of the first parallel transistors Tp1 are electrically connected between the inverting input terminals of the operational amplifiers of the current control modules of the at least two current control circuits. Gate electrodes of the first parallel transistors Tp1 are electrically connected to the first input port Input1 to enable the first parallel transistors Tp1 to be turned on simultaneously. As such, the current control modules of the at least two current control circuits are electrically connected.

Optionally, at least one of the at least two current control circuits further includes a parallel interlock module. The parallel interlock module is configured to control the current generating units of the least two current control modules, which are electrically connected, to be electrically connected to one of the voltage generating units of the at least two current control circuits when the at least two current control modules are electrically connected.

Optionally, the parallel interlock module includes a first parallel interlock module. An interlock control terminal of the first parallel interlock module is electrically connected to the first input terminal Input1, and an interlock input terminal and an interlock output terminal of the first parallel interlock module are electrically connected between the voltage output node of the voltage generating unit and the voltage input node of the current generating unit, so as to realize control of the first parallel interlock module by the parallel control signal.

Optionally, the first parallel interlock module includes a first interlock transistor. A gate electrode of the first interlock transistor serves as an interlock control terminal of the first parallel interlock module, and a source electrode and a drain electrode of the first interlock transistor serve as an interlock input terminal and an interlock output terminal of the first parallel interlock module, respectively. When the voltage output node of the voltage generating unit of the nth current control circuit is electrically connected to the voltage output node of the voltage generating unit of the (n+1)th current control circuit, one of the source electrode and the drain electrode of the first interlock transistor can be electrically connected to the voltage output node of the voltage generating unit of the (n+1)th current control circuit, and the other one of the source electrode and the drain electrode of the first interlock transistor is electrically connected to a connecting node between the non-inverting input terminal of the operational amplifier and the first parallel transistor Tp1.

It can be understood that when the voltage output nodes of the voltage generating units of the at least two current control circuits are electrically connected, there is always one of the at least two current control circuits which does not include the first parallel interlock module, so that the current control circuit which does not include the first parallel interlock module can provide the voltage signal for the current generating units of the at least two current control circuits which are electrically connected.

Specifically, please continue to refer to FIG. 2C to FIG. 2F. The parallel control circuit further includes a second parallel control module. The second parallel control module is electrically connected between the dimming modules of the at least two current control circuits and is configured to enable, according to the parallel control signal, the control output terminals of the dimming control units of the at least two current control circuits to be electrically connected. One of the dimming control units of the at least two current control circuits is configured to provide a dimming control signal for the dimming switch units of the at least two current control circuits. For example, the second parallel control module is configured to enable, according to the parallel control signal, the control output terminal of the dimming control unit of the nth current control circuit and the control output terminal of the dimming control unit of the (n+1)th current control circuit to be electrically connected. Accordingly, since the control output terminal of the dimming control unit of each of the at least two current control circuits is electrically connected to the dimming control terminal of the dimming switch unit, the dimming control terminal of the dimming switch unit of the nth current control circuit is electrically connected to the dimming control terminal of the dimming switch unit of the (n+1)th current control circuit. Both of the dimming control unit of the nth current control circuit and the dimming control unit of the (n+1)th current control circuit can provide the dimming control signal for the dimming switch unit of the nth current control circuit and the dimming switch unit of the (n+1)th current control circuit. In order to better realize a parallel connection of the nth current control circuit and the (n+1)th current control circuit, the dimming control signal is provided for the dimming switch unit of the nth current control circuit and the dimming switch unit of the (n+1)th current control circuit by the dimming control unit of the nth current control circuit or the dimming control unit of the (n+1)th current control circuit.

Optionally, the second parallel control module includes a second parallel transistor Tp2. Both of the gate electrode of the first parallel transistor Tp1 and a gate electrode of the second parallel transistor Tp2 are electrically connected to the first input port Input1. A source electrode and a drain electrode of the second parallel transistor Tp are electrically connected between the gate electrodes of the second transistors T2 of the dimming modules of the at least two current control circuits.

Optionally, the second parallel control module can include a plurality of second parallel transistors Tp2. A source electrode and a drain electrode of each of the second parallel transistors Tp2 are electrically connected between the gate electrodes of the second transistors T2 of the dimming module of the at least two current control circuits. Gate electrodes of the second parallel transistors Tp2 are electrically connected to the first input port Input 1 to enable the second parallel transistors T2 to be turned on simultaneously. As such, the dimming modules of the at least two current control circuits are electrically connected.

Optionally, the parallel interlock module is further configured to control the dimming switch units of the at least two dimming modules, which are electrically connected, to be electrically connected to one of the dimming control units of the at least two current control circuits when the at least two dimming modules are electrically connected.

Optionally, the parallel interlock module includes a second parallel interlock module. An interlock control terminal of the second parallel interlock module is electrically connected to the first input terminal Input1, and an interlock input terminal and an interlock output terminal of the second parallel interlock module are electrically connected between the control output terminal of the dimming control unit and the dimming control terminal of the dimming switch unit, so as to utilize control of the second parallel interlock module by the parallel control signal.

Optionally, the second parallel interlock module includes a second interlock transistor. A gate electrode of the second interlock transistor serves as an interlock control terminal of the second parallel interlock module, and a source electrode and a drain electrode of the second interlock transistor serve as an interlock input terminal and an interlock output terminal of the second parallel interlock module, respectively. When the control output terminal of the dimming control unit of the nth current control circuit is electrically connected to the control output terminal of the dimming control unit of the (n+1th) current control circuit, one of the source electrode and the drain electrode of the interlock transistor can be electrically connected to the control output terminal of the dimming control unit of the (n+1)th current control circuit, and the other one of the source electrode and the drain electrode of the interlock transistor is electrically connected to a connecting node between the second transistor T2 and the second parallel transistor Tp2.

It can be understood that when the control output terminals of the dimming control units of the at least two current control circuits are electrically connected, there is always one of the at least two current control circuits which does not include the second parallel interlock module, so that the current control circuit which does not include second parallel interlock provides the dimming control signal for the dimming switch units of the at least two current control circuits which are electrically connected.

The first parallel transistor Tp1 and the second parallel transistor Tp2 included in the parallel control circuit are both turned on in response to the parallel control signal received by the first input port. Accordingly, when the parallel control circuit responds to the parallel control signal received by the first input port, there are multiple current control circuits which are electrically connected through the first parallel transistor Tp1 and the second parallel transistor Tp2. However, in a practical application, after the at least two current control circuits, which are electrically connected, are electrically connected to the corresponding output ports Out of the light-emitting device driver chip, an output current is a sum of currents outputted by the at least two current control circuits, which are electrically connected through the parallel control circuit. In order to realize controllability of the number of the at least two current control circuits in parallel, the light-emitting device driver chip further includes at least one second input port. The at least two current control circuits include a first current control circuit and a second current control circuit. The second current control circuit includes a parallel selecting module.

The parallel selecting module is configured, according to a parallel selecting signal received by the corresponding second input port, to control the dimming module of the second current control circuit and the dimming module of the first current control circuit to be electrically connected, and to control the current control module in the second current control circuit and the current control module in the first current control circuit to be electrically connected.

Specifically, please continue to refer to FIG. 2E to FIG. 2F. In order to realize controllability of the number of the current control circuits in parallel, control the number of parallel current control circuits, the light-emitting device driver chip further includes at least one second input port Input2. The at least one second input port Input2 includes an Input21 and an Input22. At least two current control circuits in the current control circuit group include a first current control circuit 1001 and a second current control circuit 1002. The second current control circuit 1002 includes a parallel selecting module.

The parallel selecting module is configured to control, according to a parallel selecting signal received by the corresponding second input port Input2, the current control module in the second current control circuit 1002 and the current control module in the first current control circuit 1001 to be electrically connected.

Optionally, the parallel selecting module includes a first selecting transistor Ts1. A source electrode and a drain electrode of the first selecting transistor Ts1 are electrically connected between the non-inverting input terminal of the operational amplifier of the second current control circuit 1002 and one of the source electrode and the drain electrode of the first parallel transistor Tp1.

Optionally, when the current control circuits further includes a dimming mode, the parallel selecting module is further configured to control, according to the parallel selecting signal received by the corresponding second input port Input2, the dimming module of the second current control circuit 1002 and the diming module of the first current control circuit 1001 to be electrically connected.

Optionally, the parallel selecting module further includes a second selecting transistor Ts2. A source electrode and a drain electrode of the second selection transistor Ts2 are electrically connected between the gate electrode of the second transistor T2 of the second current control circuit 1002 and one of the source electrode and the drain electrode of the second parallel transistor Tp2.

The gate electrode of the first selecting transistor Ts1 and the gate electrode of the second selecting transistor Ts2 in the second current control circuit 1002 are electrically connected to the second input port Input2.

It can be understood that the current control circuit group can include one first current control circuit 1001 and a plurality of second current control circuits 1002. Parallel selecting modules included in the second current control circuits 1002 are electrically connected to different second input ports Input2.

Optionally, when the number of the current control circuits in parallel is controllable through the parallel selecting modules, the first parallel control module can only include one first parallel transistor Tp1, and the second parallel control module can only include one second parallel transistor Tp2. An electrical connection of at least two current control circuits included in the current control circuit group and the controllability of the number of the current control circuits in parallel are realized by cooperation of the parallel selecting module and the parallel control circuit. Furthermore, since only one first parallel transistor Tp1 and one second parallel transistor Tp2 are included, each of the current control circuits can independently work to output a current to the corresponding output port when the first parallel transistor Tp1, the second parallel transistor Tp2, the first selecting transistor Ts1, and the second selecting transistor Ts2 are all turned off. The current control circuit group shown in FIG. 2F is taken as an example. A working principle of the parallel control circuit and the current control circuits of the light-emitting device driver chip will be described.

When a current required in an application scenario is less than or equal to a maximum current outputted by each output port Out of the light-emitting device driver chip, each of the current control circuits of multiple current control circuit groups included in the light-emitting device driver chip independently outputs a current. When each of the current control circuits independently outputs the current, the voltage signals which the voltage generating units of the current control circuits provides for the current generating units are different. As a result, working states and turn-on situations of the first transistors in the current control circuits are different.

The light-emitting device driver chip receives a brightness control signal outputted by a timing controller and/or a micro-control processing unit, so that the dimming register in each of the current control circuits outputs the dimming control signal to control the second transistor T2 to be turned on or off. That is, the dimming module realizes control of a light-emitting device switching duration of the by adjusting a duty cycle. The voltage generating unit in each of the current control circuits outputs a voltage signal to the non-inverting input terminal of the operational amplifier according to the brightness control signal outputted by the timing controller and/or the micro-control processing unit. According to virtual short and virtual open characteristics, a voltage signal at the inverting input terminal is the same as the voltage signal at the non-inverting input terminal. When the first transistor T1 is turned on, a current flowing to the corresponding output port Out is a ratio of a voltage value at the inverting input terminal to the first resistor R1. That is, the current control module is configured to control the current flowing through a light-emitting device. For example, the light-emitting device driver chip has 48 output ports Out. Correspondingly, there are 48 current control circuits inside the light-emitting device driver chip. Each of the current control circuits can output a maximum current of 20 mA to the corresponding output port Out. When a current required in an application scenario is less than 20 mA, the 48 current control circuits included in the light-emitting device driver chip can independently control 48 light-emitting units through the 48 output ports Out. A current range of each of the current control circuits provided for the corresponding light-emitting unit is 0 mA-20 mA.

When a required current is greater than the maximum current outputted by each output port Out of the light-emitting device driver chip, the first transistor T1 and the second transistor T2 receive the parallel control signal and are turned on. The current generating units of the current control circuits included in the current control circuit group only receive a voltage signal outputted by a voltage generating unit (e.g., the current generating units of the (n−A)th current control circuit, . . . , the nth current control circuit, the (n+1)th current control circuit, . . . , and the (n+B)th current control circuit only receive the voltage signal outputted by the voltage generating unit of the nth current control circuit), so that the non-inverting input terminals of the operational amplifiers of the current control circuits receive the same voltage signal to simultaneously turn on the first transistors T1 of the current control circuits. The dimming switch units of the current control circuits included in the current control circuit group only receive a dimming control signal outputted by a dimming control unit (e.g., the dimming switch units of the (n−A)th current control circuit, . . . , the nth current control circuit, the (n+1)th current control circuit, . . . , and the (n+B)th current control circuit only receive the dimming control signal outputted by the dimming control unit of the nth current control circuit), so that the second transistors T2 of the current control circuits are turned on simultaneously, and the current control modules in the current control circuits generate the same current. Then, in a practical application, an electrical connection is realized in the current control circuit group. The output ports corresponding to the current control circuits outputting the same current are electrically connected to the same node, so that the light-emitting device driver chip can provide a greater output current to broaden an application range of the light-emitting device driver chip. For example, when a required current in an application scene is greater than 20 mA (e.g., the maximum current needs to reach 36 mA), there is no need to import and verify a new light-emitting device driver chip. When the current control circuits are used in parallel, the maximum current outputted by the light-emitting device driver chip can be increased to 40 mA.

When a current required in an application scenario is greater, the number of the current control circuits in parallel included in the current control circuit group is greater. For example, when the current required by the application scenario is greater than 20 mA and less than or equal to 40 mA, the first selecting transistor Ts1 and the second selecting transistor Ts2 of one current control circuit in the second current control circuits 1002 are turned on, so as to control two of the current control circuits in the current control circuit group to be connected in parallel. When a current required in an application scenario is greater than 40 mA and less than or equal to 60 mA, the first selecting transistors Ts1 and the second selecting transistors Ts2 of two current control circuits in the second current control circuits are turned on, and the first selecting transistors Ts1 and the second selecting transistors Ts2 of the two current control circuits are simultaneously turned on according to the parallel selection signals received by different second input ports Input2, so as to control three current control circuits groups in the current control circuit group to be connected in parallel. The rest can be deduced by analogy to obtain more schemes wherein the current control circuits are connected in parallel.

Optionally, the first transistor T1, the second transistor T2, the first parallel transistor Tp1, the second parallel transistor Tp2, the first selecting transistor Ts1, and the second selecting transistor Ts2 can be field-effect transistors or thin-film transistors. Optionally, the first transistor T1, the second transistor T2, the first parallel transistor Tp1, the second parallel transistor Tp2, the first selecting transistor Ts1, and the second selecting transistor Ts2 can be P-type transistors or N-type transistors.

Figure 3:
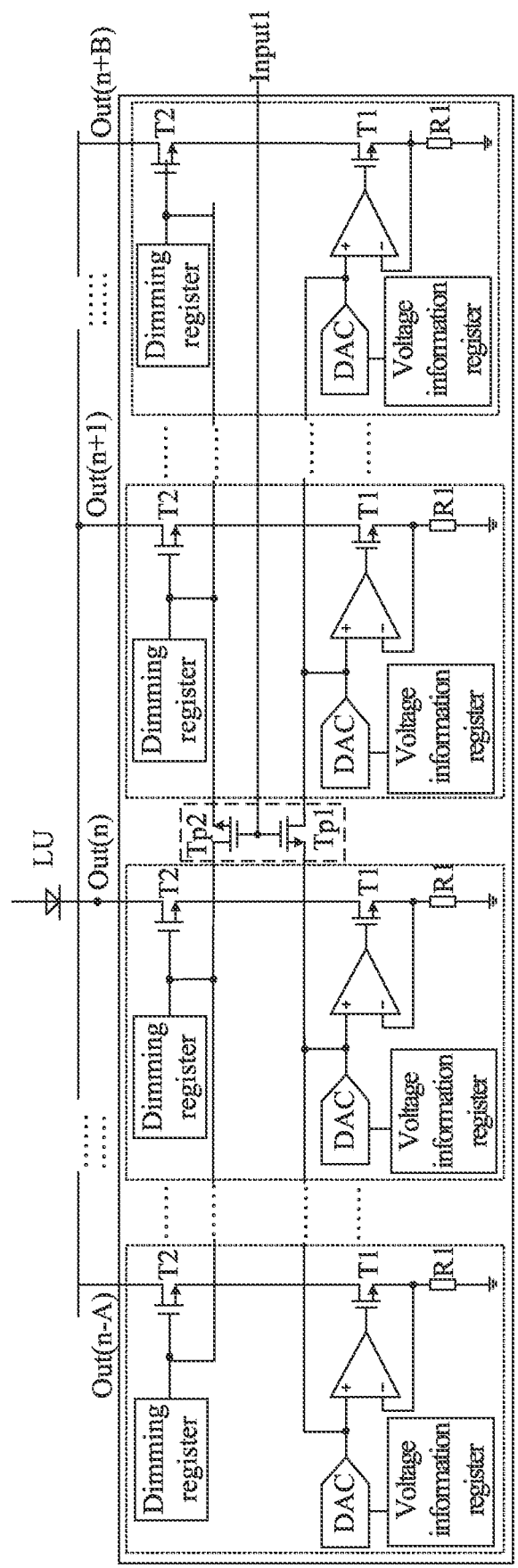
FIG. 3 illustrates a schematic diagram of an electrical connection structure of a light-emitting unit and a light-emitting device driver chip provided by an embodiment of the present disclosure.

FIG. 3 illustrates a schematic diagram of an electrical connection structure of a light-emitting unit and a light-emitting device driver chip provided by an embodiment of the present disclosure. The present disclosure further provides a backlight module, which includes any one of the above-mentioned light-emitting device driver chips and a light-emitting unit LU connected to the any one of the above-mentioned light-emitting device driver chips. The light-emitting unit LU includes at least one light-emitting device.

When the backlight module works in a first mode, the current control modules of the at least two current control circuits output the same current to the corresponding output ports through the control output nodes, and the output ports of the light-emitting device driver chip corresponding to the at least two current control circuits are electrically connected to each other. As such, the light-emitting device driver chips output a greater current to the light-emitting unit LU, so that the backlight module works in the first model.

Optionally, the electrical connection of the output ports of the light-emitting device driver chip corresponding to the at least two current control circuits can realized in a wire form. Optionally, the at least one light-emitting device includes an organic light-emitting diode, a sub-millimeter light-emitting diodes, a micro light-emitting diode, or the like.

When the backlight module works in a second mode, each of the at least two current control circuits of the light-emitting device driver chip works independently. An output current which the light-emitting device driver chip provides for the light-emitting unit LU when the backlight module works in the second mode is smaller than an output current which the light-emitting device driver chip provides for the light-emitting unit LU when the backlight module works in the first mode.

Optionally, the backlight module further includes a control module. The control module is electrically connected to the first input port and is configured to output the parallel control signal.

Figure 4:
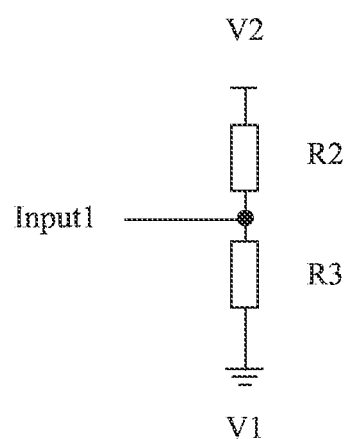
FIG. 4 illustrates a schematic structural diagram of a control module provided by an embodiment of the present disclosure.

Optionally, FIG. 4 illustrates a schematic structural diagram of a control module provided by an embodiment of the present disclosure. The control module includes a second resistor R2 and a third resistor R3. The second resistor R2 is connected in series between a second voltage terminal V2 and the first input port Input1. The third resistor R3 is connected in series between a first voltage terminal V1 and the first input port Input1. When the parallel control circuit electrically connects the current control modules of the at least two current control circuits, a voltage signal supplied by the first voltage terminal V1 and a voltage signal supplied by the second voltage terminal V2 are not equal.

Further, the first parallel transistor Tp1 and the second parallel transistor Tp2 are both N-type transistors. When the parallel control circuit electrically connects the current control modules of the at least two current control circuits, a voltage value of the first voltage terminal V1 is smaller than a voltage value of the second voltage terminal V2. As such, the parallel control signal is outputted to the first parallel transistor Tp1 and the second parallel transistor Tp2 through the first input port Input1, thereby realizing the turn-on control of the first parallel transistor Tp1 and the second parallel transistor Tp2. When the parallel control circuit does not work (i.e., the current control circuits work independently), the voltage value of the first voltage terminal V1 is equal to the voltage value of the second voltage terminal V2.

The present disclosure further provides a display panel. The display panel includes any one of the above-mentioned light-emitting device driver chips or any one of the above-mentioned backlight modules.

Optionally, the display panel includes a passive light-emitting display panel or an active light-emitting display panel. The passive light-emitting display panels include a liquid crystal display panel or the like. The active light-emitting display panel is a display panel including light-emitting devices. The light-emitting devices include organic light-emitting diodes, sub-millimeter light-emitting diodes, micro light-emitting diodes, or the like.

The present disclosure further provides a display device. The display device includes any one of the above-mentioned light-emitting device driver chips, any one of the above-mentioned backlight modules, or any one of the above-mentioned display panels.

It can be understood that the display device includes a movable display device (e.g., a notebook computer, a mobile phone, or the like), a fixed terminal (e.g., a desktop computer, a televisions, or the like), or a measurement device (e.g., a sports bracelet, a thermometer, or the like).

Although the principles and implementations of the present disclosure are described by using specific examples in this specification, the descriptions of the foregoing embodiments are merely intended to help understand the method and the core idea of the method of the present disclosure. In addition, those skilled in the art can make modifications to the specific implementations and application range according to the idea of the present disclosure. In conclusion, the content of this specification is not construed as a limitation to the present disclosure.

What is claimed is:

1. A light-emitting device driver chip, having a plurality of output ports, the light-emitting device driver chip comprises:
    at least two current control circuits, wherein each of the at least two current control circuits comprising a current control module, and a control output node of the current control module is electrically connected to a corresponding one of the output ports; and
    a parallel control circuit, wherein the parallel control circuit is electrically connected between the at least two current control circuits and is configured to control, according to a parallel control signal received from a first input port, the current control modules of the at least two current control circuits to be electrically connected to enable the current control modules of the at least two current control circuits to output the same current to corresponding ones of the output ports through the control output nodes.

2. The light-emitting device driver chip of claim 1, wherein the current control module comprises a voltage generating unit and a current generating unit, a voltage output node of the voltage generating unit is electrically connected to a voltage input node of the current generating unit, and the current generating unit is configured to receive a voltage signal generated by the voltage generating unit to generate a current output to the control output node;
    the parallel control circuit comprises a first parallel control module, the first parallel control module is electrically connected between the current control modules of the at least two current control circuits and is configured to enable, according to the parallel control signal, the voltage output nodes of the voltage generating units of the current control modules to be electrically connected; and
    one of the voltage generating units of the current control modules is configured to provide the voltage signal for the current generating units of the current control modules.

3. The light-emitting device driver chip of claim 2, wherein the current generating unit comprises an operational amplifier, a first transistor, and a first resistor; the first resistor is connected in series between one of a source electrode and a drain electrode of the first transistor and a first voltage terminal, and the first resistor is connected in series between an inverting input terminal of the operational amplifier and the first voltage terminal; and the voltage output node of the voltage generating unit is electrically connected to a non-inverting input terminal of the operational amplifier through the voltage input node of the current generating unit, a gate electrode of the first transistor is connected to an output terminal of the operational amplifier, and the other of the source electrode and the drain electrode of the first transistor is electrically connected to the control output node; and
    the first parallel control module is electrically connected to the non-inverting input terminals of the operational amplifiers of the current control modules.

4. The light-emitting device driver chip of claim 3, wherein the voltage generating unit comprises a voltage information register and a digital-to-analog converter; and one terminal of the digital-to-analog converter is electrically connected to the voltage information register, and the other terminal of the digital-to-analog converter is electrically connected to the non-inverting input terminal of the operational amplifier through the voltage output node of the voltage generating unit.

5. The light-emitting device driver chip of claim 3, wherein each of the at least two current control circuits further comprises a dimming module, a dimming input node of the dimming module is electrically connected to the control output node of the current control module, and a dimming output node of the dimming module is electrically connected to a corresponding one of the output ports; and
    the parallel control circuit is further configured to electrically connect the dimming modules of the at least two current control circuits according to the parallel control signal to enable the at least two current control circuits to output the same current to the corresponding ones of the output ports.

6. The light-emitting device driver chip of claim 5, wherein the dimming module comprises a dimming control unit and a dimming switch unit, a control output terminal of the dimming control unit is electrically connected to a dimming control terminal of the dimming switch unit, a dimming input terminal of the dimming switch unit is electrically connected to the dimming input node of the dimming module, and a dimming output terminal of the dimming switch unit is electrically connected to the dimming output node of the dimming module;
    the parallel control circuit further comprises a second parallel control module, and the second parallel control module is electrically connected between the dimming modules of the at least two current control circuits and is configured to enable, according to the parallel control signal, the control output terminals of the dimming control units of the at least two current control circuits to be electrically connected; and
    one of the dimming control units of the at least two current control circuits is configured to provide a dimming control signal for the dimming switch units of the at least two current control circuits.

7. The light-emitting device driver chip of claim 6, wherein the dimming control unit comprises a dimming register, and an output terminal of the dimming register serves as the control output terminal of the dimming control unit; and
    the dimming switch unit comprises a second transistor, a gate electrode of the second transistor serves as the dimming control terminal of the dimming switch unit, and a source electrode and a drain electrode of the second transistor serve as the dimming input terminal and the dimming output terminal of the dimming switch unit, respectively.

8. The light-emitting device driver chip of claim 7, wherein the first parallel control module comprises a first parallel transistor, a source electrode and a drain electrode of the first parallel transistor are electrically connected between the non-inverting input terminals of the operational amplifiers of the current control modules; and the second parallel control module comprises a second parallel transistor, a gate electrode of the first parallel transistor and a gate electrode of the second parallel transistor are electrically connected to the first input port, and a source electrode and a drain electrode of the second parallel transistor are electrically connected between the gate electrodes of the second transistors of the dimming modules of the at least two current control circuits.

9. The light-emitting device driver chip of claim 8, further comprising at least one second input port, wherein the at least two current control circuits comprise a first current control circuit and a second current control circuit, and the second current control circuit comprises a parallel selecting module; and the parallel selecting module is configured, according to a parallel selecting signal received by a corresponding one of the at least one second input port, to control the dimming module of the second current control circuit and the dimming module of the first current control circuit to be electrically connected, and to control the current control module of the second current control circuit and the current control module of first current control circuit to be electrically connected.

10. The light-emitting device driver chip of claim 9, wherein the parallel selecting module comprises:

a first selecting transistor, wherein a source electrode and a drain electrode of the first selecting transistor are electrically connected between the non-inverting input terminal of the operational amplifier of the second current control circuit and one of the source electrode and the drain electrode of the first parallel transistor; and a second selecting transistor, wherein a source electrode and a drain electrode of the second selection transistor are electrically connected between the gate electrode of the second transistor of the second current control circuit and one of the source electrode and the drain electrode of the second parallel transistor;

wherein the gate electrode of the first selecting transistor and the gate electrode of the second selecting transistor in the second current control circuit are electrically connected to the second input port.

11. A backlight module, comprising the light-emitting device driver chip of claim 1 and a light-emitting unit connected to the light-emitting device driver chip, the light-emitting unit comprising at least one light-emitting device;

wherein when the backlight module works in a first mode, the current control modules of the at least two current control circuits output the same current to the corresponding ones of the output ports through the control output nodes, and the output ports of the light-emitting device driver chip corresponding to the at least two current control circuits are electrically connected to each other.

12. The backlight module of claim 11, further comprising:

a control module, wherein the control module is electrically connected to the first input port and is configured to output the parallel control signal.

13. The backlight module of claim 12, wherein the control module comprises:

a second resistor connected in series between a second voltage terminal and the first input port; and a third resistor connected in series between a first voltage terminal and the first input port;

wherein when the parallel control circuit electrically connects the current control modules of the at least two current control circuits, a voltage signal supplied by the first voltage terminal and a voltage signal supplied by the second voltage terminal are not equal.

14. A display panel, comprising the light-emitting device driver chip of claim 1.

* * * * *